United States Patent
Miller et al.

(10) Patent No.: US 11,760,416 B2
(45) Date of Patent: Sep. 19, 2023

(54) LANE DETECTION AND ALERT SYSTEM

(71) Applicant: Bendix Commercial Vehicle Systems LLC, Elyria, OH (US)

(72) Inventors: Justin R Miller, Elyria, OH (US); Jeffrey M Carbaugh, Lakewood, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 101 days.

(21) Appl. No.: 17/463,680

(22) Filed: Sep. 1, 2021

(65) Prior Publication Data

US 2023/0065901 A1 Mar. 2, 2023

(51) Int. Cl.
*B62D 15/02* (2006.01)
*B60K 28/00* (2006.01)
*B60Q 9/00* (2006.01)
*B60W 30/18* (2012.01)

(52) U.S. Cl.
CPC .......... *B62D 15/0255* (2013.01); *B60K 28/00* (2013.01); *B60Q 9/00* (2013.01); *B60W 30/18163* (2013.01)

(58) Field of Classification Search
None
See application file for complete search history.

(56) References Cited

U.S. PATENT DOCUMENTS

| | | | |
|---|---|---|---|
| 9,809,164 B2 * | 11/2017 | Matsuno | B60Q 9/00 |
| 10,131,356 B2 | 11/2018 | Takae | |
| 10,410,524 B2 * | 9/2019 | Norwood | G06V 20/58 |
| 10,896,606 B1 * | 1/2021 | Hayes | G05D 1/0022 |
| 11,148,669 B2 * | 10/2021 | Tomescu | B60W 30/09 |
| 11,299,152 B2 * | 4/2022 | Ishioka | B60W 10/20 |
| 11,541,891 B2 * | 1/2023 | Aoki | B60W 30/16 |
| 2015/0360684 A1 * | 12/2015 | Matsuno | B60W 30/18163 701/23 |
| 2015/0360721 A1 * | 12/2015 | Matsuno | B60W 30/18163 701/1 |
| 2017/0183007 A1 * | 6/2017 | Oh | B60W 30/16 |

(Continued)

FOREIGN PATENT DOCUMENTS

| | | | | |
|---|---|---|---|---|
| BR | 112019019989 A2 * | 4/2020 | | B60W 10/18 |
| DE | 102015210986 A1 * | 12/2015 | | B60Q 9/00 |

(Continued)

OTHER PUBLICATIONS

European Patent Office, "International Search Report and Written Opinion," Opinion, dated Dec. 6, 2022, 10 pages, European Patent Office, Rijswijk, Netherlands.

*Primary Examiner* — Kevin R Steckbauer
(74) *Attorney, Agent, or Firm* — Cheryl L. Greenly; Brian E. Kondas

(57) ABSTRACT

A lane detection system for a vehicle includes at least one sensor for sensing lane markers and objects in the vicinity of a host vehicle, a driver interface in the host vehicle, and a controller having control logic. The control logic receives signals from the at least one sensor, determines a present lane of travel based on the sensor signals received, determines that a time that the host vehicle has been in the present lane of travel meets or exceeds a predetermined time, and transmits an alert signal to the driver interface in response to the time meeting or exceeding the predetermined time.

17 Claims, 2 Drawing Sheets

(56) References Cited

U.S. PATENT DOCUMENTS

| | | | | |
|---|---|---|---|---|
| 2018/0033309 A1* | 2/2018 | Norwood | ............ | B62D 15/029 |
| 2019/0147262 A1* | 5/2019 | Kuehnle | ............... | B60W 40/09 |
| | | | | 340/439 |
| 2019/0147263 A1* | 5/2019 | Kuehnle | ............... | G07C 5/0866 |
| | | | | 340/439 |
| 2019/0329780 A1* | 10/2019 | Tomescu | ................ | G08G 1/162 |
| 2020/0122722 A1* | 4/2020 | Ishioka | ................ | B60W 10/20 |
| 2021/0146928 A1 | 5/2021 | Clarke | | |
| 2022/0212670 A1* | 7/2022 | Aoki | ..................... | B60W 30/16 |
| 2023/0065901 A1* | 3/2023 | Miller | ................. | G06V 20/588 |

FOREIGN PATENT DOCUMENTS

| | | | | |
|---|---|---|---|---|
| EP | 3196861 A1 * | 7/2017 | ............ | B60W 30/09 |
| FR | 3077548 A1 * | 8/2019 | ...... | B60W 30/18163 |
| FR | 3077548 A1 | 8/2019 | | |
| GB | 2579026 A * | 6/2020 | ............ | B60W 30/09 |
| WO | WO-2020099558 A1 * | 5/2020 | ............ | B60W 30/09 |
| WO | WO-2022240823 A1 * | 11/2022 | ............ | B60W 10/04 |

\* cited by examiner

LANE DETECTION AND ALERT SYSTEM

BACKGROUND

The present application relates to a system and method for determining the travel lane of a vehicle and notifying the driver when a lane change may be necessary due to the time the vehicle has spent in the particular travel lane. When vehicles are on multi-lane highways, the left lane or leftmost lanes are reserved for vehicles that are passing slower vehicles. A vehicle should not stay in the leftmost lane after passing a slower vehicle but should return to the right lane. If faster vehicles are present behind the vehicle in the left lane, they can no longer pass in the correct left lane if the original vehicle remains in the left lane. Traffic may back up and driver irritation may grow.

Accordingly, those skilled in the art continue with research and development efforts in the field of lane detection systems and driver awareness of their lane of travel.

SUMMARY

In accordance with one embodiment, a lane detection system for a vehicle includes at least one sensor for sensing lane markers and objects in the vicinity of a host vehicle, a driver interface in the host vehicle, and a controller having control logic. The control logic receives signals from the at least one sensor, determines a present lane of travel based on the sensor signals received, determines that a time that the host vehicle has been in the present lane of travel meets or exceeds a predetermined time, and transmits an alert signal to the driver interface in response to the time meeting or exceeding the predetermined time.

In accordance with another embodiment, a method of lane detection for a vehicle includes detecting a present lane of travel of a host vehicle, measuring a time the host vehicle has remained in the present lane of travel and comparing the time with a predetermined time. The control logic transmits an alert signal to the driver of the host vehicle in response to the time meeting or exceeding the predetermined time.

DETAILED DESCRIPTION

Figure 1:
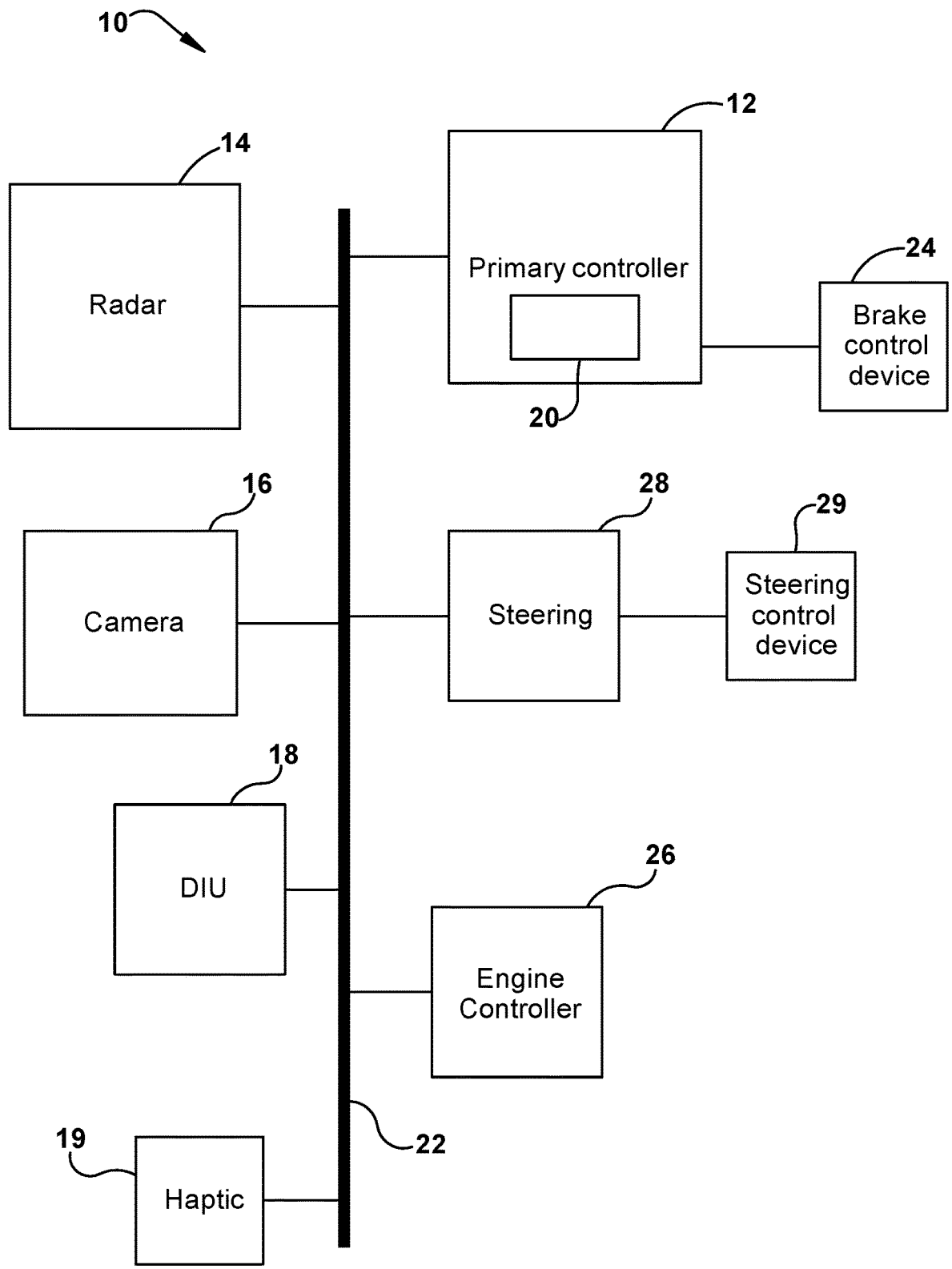
FIG. 1 is a representation of a vehicle system having the present features.

Referring to FIG. 1, a vehicle system 10 having the features of the present invention are shown. The vehicle system 10 includes at least one sensor for detecting the present lane of travel of the host vehicle. The sensors may include radars 14, cameras 16 or other types and combinations of sensors. The sensors detect lane markers and objects such as other vehicles surrounding the host vehicle as the host vehicle is traveling on the highway.

The vehicle system 10 includes a primary controller 12. The primary controller 12 may control the anti-lock braking and automated braking features, such as electronic stability control and advanced cruise control with braking, as well as lane keeping systems of the host vehicle. If the primary controller 12 includes braking control functions, it is connected to at least one brake control device 24. The at least one brake control device 24 may include traction valves and modulator valves for implementing the brake control functions.

The primary controller 12 includes control logic 20. The control logic 20 receives signals from the radars 14 and cameras 16, as well as other sensors on the vehicle. The control logic 20 may receive signals directly from the radars 14 and cameras 16 or may receive the signals via a communications bus 22. The vehicle communications bus 22 may use a standard protocol, such as SAE J1939. The control logic 20 determines a present lane of travel of the vehicle using the information from at least one sensor. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20. The control logic 20 may also transmit control signals to other controllers on the communications bus 22. The control logic 20 also includes a timer device.

A driver interface unit 18 is a human-machine interface located within sight and/or hearing range and/or contact range of the driver of the host vehicle. The display 18 communicates with the primary controller 12 and other systems over the vehicle communications bus 22. The driver interface unit 18 transmits visual or audible alerts to the driver of the host vehicle in response to signals received. The driver interface unit 18 may also have a switch or other means for a driver of the host vehicle to enable or disable the system 10. Other means many include receiving a signal on the vehicle communications bus 22 to enable or disable the system 10.

The system 10 may also include a haptic device 19. The haptic device 19 may be a device that vibrates the steering wheel or driver's seat in response to a signal received over the vehicle communications bus 22 or directly from primary controller 12.

A steering controller 28 is in communication with the primary controller 12 and other systems over the vehicle communications bus 22. The steering controller 28 controls a steering control device 29 for automatically implementing steering control events on the host vehicle. The steering control device 29 may be an electrohydraulic device connected to the steering column of the vehicle.

An engine controller 26 is in communication with the primary controller 12 and other systems on the vehicle communications bus 22. The engine controller 26 controls the speed of the host vehicle and may change the speed in response to signals on the vehicle communications bus 22.

Therefore, a lane detection system for a vehicle includes at least one sensor for sensing lane markers and objects in the vicinity of a host vehicle, a driver interface in the host vehicle, and a controller having control logic. The control logic receives signals from the at least one sensor, determines a present lane of travel based on the sensor signals received. The control logic communications with other devices on the vehicle, such as a driver interface unit, an engine controller, and a steering controller.

Figure 2:
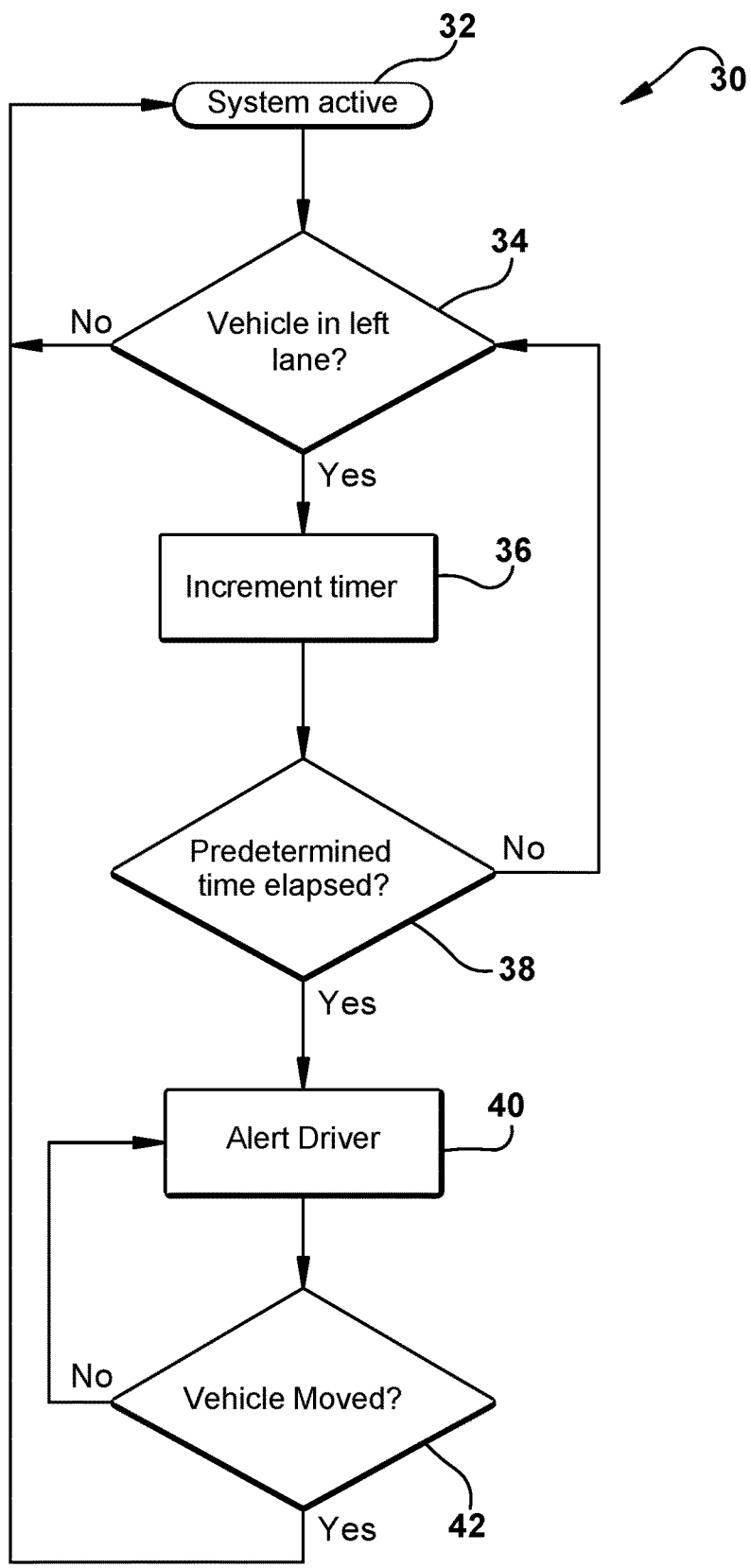
FIG. 2 is a representation of a method of implementing the present features.

FIG. 2 shows a method 30 of lane detection for a host vehicle. The method 30 begins with the lane detection system 10 being enabled in step 32. The system 10 may be enabled by the driver or may be automatically enabled during start up of the host vehicle.

The method 30 continues with the control logic 20 determining which lane of travel the host vehicle is in. The control logic 20 uses input from the radars 14 and cameras 16 to determine the lane of travel. In a multi-lane highway, the host vehicle could be traveling in any number of lanes. However, if the control logic 20 determines that the host vehicle is traveling in a lane left of a right most travel lane, a timer will begin.

Alternatively, based on the rules preset in the controller based on the country of operation or the requirements of a particular fleet operation, the control logic 20 may determine that the host vehicle is traveling to the right of a desired lane of travel or the control logic 20 may determine that the host vehicle is traveling in a lane right of the left most travel lane when beginning the timer.

In step 36, the timer is incremented. In step 38, the timer is compared to a predetermined time period. The predetermined time period may be programmable or may be pre-assigned by the manufacturer or fleet manager in the host vehicle. In one example, the predetermined time is about three minutes. In another example, the predetermined time is about fifteen minutes. If the timer is less than the predetermined time, the method 30 returns to step 34 to determine if the host vehicle is still in the same lane of travel (left of a right hand travel lane). If the timer is equal to or greater than the predetermined time, the method 30 continues to step 40.

In step 40, the driver is alerted through the driver interface unit 18 or the haptic unit 19 that the time the host vehicle has been in the present lane of travel has been greater than or equal to the predetermined time. In one example, a visual indicator is illuminated on the driver interface unit 18. In another example, an audible indicator is activated in the driver interface unit 18. In yet another example, the haptic device 19 is activated to either vibrate the steering wheel or driver's seat. The alerts would remain active as long as the host vehicle remains in the present lane of travel.

In yet another example, the alerts can be cascaded based on different predetermined periods of time. For the shortest period of time being exceeded, a visual indicator can be used. If the period of time the vehicle is in the left lane increases beyond a second period of time, an audible indicator can be activated, along with or in place of the visual indicator. If the period of time the vehicle is in the left lane increases to a third period of time, a haptic indicator can be activated along with or in place of the visual indicator and the audible indicator. For example, the first period of time may be three minutes, the second period of time may be five minutes, and the third period of time may be fifteen minutes.

If the period of time the vehicle is in the left lane increases beyond the third period, or the longest programmed amount of time, a lane change request can be made. A signal to change lanes may be transmitted after the alert signal has been transmitted for a period of time or has progressed to the highest alert level with no response from the driver. In one example, the lane change can be implemented via the steering controller 28 and steering control device 29. The steering intervention would only be made with input from the cameras 16 and radars 14 to ensure that the desired lane of travel is free of traffic. Alternatively, a lane change could be made using the primary controller 12, when it is also functioning as a brake controller, and the brake control device 24. The control logic 20 would transmit a signal to the brake control device 24 to guide the vehicle to a desired lane of travel by braking a particular wheel end or set of wheel ends.

As a deterrent to remaining in the left most lane of travel beyond the predetermined period of time, the control logic 20 may also transmit a control signal to the engine controller 26. The engine controller 26 would reduce the maximum speed the host vehicle could travel to discourage the driver from traveling in the left lane(s) for long periods of time. The signal to reduce vehicle speed may be transmitted after the alert signal has been transmitted for a period of time or has progressed to the highest alert level with no response from the driver.

In step 42, the control logic 20 uses the input from the radars 14 and cameras 16 to determine whether the vehicle has changed to a different lane of travel. If the vehicle has not moved, the method 30 returns to step 40. If the host vehicle has moved to a different lane of travel, the timer is reset and the method 30 returns to step 32 with the system remaining active but any current alerts being disabled. The host vehicle could move to the right lane or another left lane, on a multilane highway.

This system can be used on any type of vehicle, including commercial vehicles such as tractor-trailers and buses, as well as passenger vehicles.

Therefore, a method of lane detection for a vehicle includes detecting a present lane of travel of a host vehicle, measuring a time the host vehicle has remained in the present lane of travel and comparing the time with a predetermined time. The control logic transmits an alert signal to the driver of the host vehicle in response to the time meeting or exceeding the predetermined time.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A lane detection system for a vehicle comprising:
    means to detect a present lane of travel of a host vehicle;
    means of measuring a time the host vehicle remains in the present lane of travel; and
    means for progressively alerting the driver of the host vehicle in response to the time the host vehicle remains in the present lane of travel meeting or exceeding a predetermined first second and third period of time; and
    means for transmitting a change lane signal in response to the time the host vehicle remains in the present lane of travel exceeding the predetermined third period of time.

2. The lane detection system as in claim 1, further comprising means for changing the lane of travel from the present lane of travel to a desired lane of travel in response to the time the host vehicle remains in the present lane of travel.

3. The lane detection system as in claim 1, wherein the predetermined first, second and third period of time is pre-assigned in the means to detect the present lane of travel.

4. The lane detection system as in claim 1, wherein means for progressively alerting the driver includes a visual alert, followed by an audible alert, and followed by a haptic alert.

5. A lane detection system for a vehicle comprising:
- at least one sensor for sensing lane markers and objects in the vicinity of a host vehicle;
- a driver interface in the host vehicle including an audible device, a visual device and a haptic device; and
- a controller, the controller having control logic for receiving signals from the at least one sensor, determining a present lane of travel based on sensor signals received, comparing a time that the host vehicle has been in the present lane of travel to a predetermined time, and transmitting a progressive alert signal to the driver interface in response to the time meeting or exceeding the predetermined time; wherein the progressive alert signal begins with requesting a visual signal from the visual device for a first time period of the predetermined time, requesting an audible signal from the audible device for a second time period of the predetermined time, and requesting a haptic signal from the haptic device for a third time period of the predetermined time, wherein the control logic transmits a change lane signal when the third time period has been completed.

6. The lane detection system as in claim 5, further comprising: the control logic determining a desired lane of travel and transmitting a change lane signal to a steering control system to move the host vehicle to the desired lane of travel in response to the time the host vehicle remains in the present lane of travel, wherein the steering control system moves the host vehicle out of the present lane of travel into the desired lane of travel in response to the change lane signal.

7. The lane detection system as in claim 5, further comprising: the control logic transmitting a speed reduction signal to an engine controller in response to the time the host vehicle remains in the present lane of travel.

8. The lane detection system as in claim 5, wherein the predetermined time is between about three minutes and fifteen minutes.

9. The lane detection system as in claim 5, wherein the predetermined time is configurable within the controller.

10. The lane detection system as in claim 5, wherein the progressive alert signal further comprises requesting an audible signal together with the visual signal during a second time period and requesting a haptic signal together with the visual signal and the audible signal during a third time period.

11. The lane detection system as in claim 5, wherein the control logic transmits a speed reduction signal when the third time period has been completed.

12. A method of lane detection for a vehicle comprising:
- detecting a present lane of travel of a host vehicle;
- measuring a time the host vehicle has remained in the present lane of travel;
- comparing the time with a first predetermined time, second predetermined time and third predetermined time;
- transmitting a progressive alert signal to the driver of the host vehicle in response to the time meeting or exceeding the first predetermined time;
- transmitting the progressive alert signal to the driver of the host vehicle in response to the time meeting or exceeding the second predetermined time;
- transmitting the progressive alert signal to the driver of the host vehicle in response to the time meeting or exceeding the third predetermined time, and
- transmitting a change lane signal to a steering controller after the third predetermined time.

13. The method as in claim 12, further comprising transmitting a speed reduction signal to an engine controller after the alert signal is transmitted.

14. The method as in claim 12, further comprising deactivating the alert signal in response to the vehicle changing lanes from the present lane of travel.

15. The method as in claim 12, wherein the total of the first predetermined time, second predetermined time and third predetermined time is between about three minutes and fifteen minutes.

16. The method as in claim 12, further comprising configuring the predetermined time within a controller.

17. The method as in claim 12, wherein the progressive alert signal includes activating a visual alert, followed by activating an audible alert and followed by activating a haptic alert.

* * * * *